(12) United States Patent
Lafontaine et al.

(10) Patent No.: US 8,894,356 B2
(45) Date of Patent: Nov. 25, 2014

(54) RETRACTABLE GAS TURBINE INLET COILS

(75) Inventors: Eric Milton Lafontaine, Atlanta, GA (US); Michael Adelbert Sullivan, Woodstock, GA (US); Huong Van Vu, Duluth, GA (US); Bhalchandra Arun Desai, Smyrna, GA (US); Mark Andrew Cournoyer, Coventry, RI (US)

(73) Assignee: General Electric Company, Schenectady, NY (US)

( * ) Notice: Subject to any disclaimer, the term of this patent is extended or adjusted under 35 U.S.C. 154(b) by 764 days.

(21) Appl. No.: 13/215,498

(22) Filed: Aug. 23, 2011

(65) Prior Publication Data

US 2013/0051994 A1 Feb. 28, 2013

(51) Int. Cl.
*F02C 7/143* (2006.01)

(52) U.S. Cl.
CPC ..................................... *F02C 7/143* (2013.01)
USPC ....................................... 415/121.3; 415/177

(58) Field of Classification Search
USPC .................. 415/121.3, 177–180; 165/86, 96; 62/186, 404; 60/728
See application file for complete search history.

(56) References Cited

U.S. PATENT DOCUMENTS

| 7,007,484 | B2 | 3/2006 | Stegmaier et al. |
| 7,644,573 | B2 | 1/2010 | Smith et al. |
| 7,648,564 | B2 | 1/2010 | Chillar et al. |

OTHER PUBLICATIONS

U.S. Appl. No. 13/215,583, filed Aug. 23, 2011 (pending).

*Primary Examiner* — Edward Look
*Assistant Examiner* — Maxime Adjagbe
(74) *Attorney, Agent, or Firm* — Nixon & Vanderhye P.C.

(57) ABSTRACT

A gas turbine inlet heat exchange coil assembly includes a gas turbine inlet housing formed to include an inlet and an outlet and a flow path therebetween. A plurality of adjacent coils are located in proximity to the inlet, and moveable between a closed operative position where the coils are aligned substantially in a plane so as to maximize resistance to flow along the flow path, and an open inoperative position where said coils are individually rotated substantially 90° such that the coils lie in individual, parallel planes so as to minimize resistance to flow along the flow path.

20 Claims, 4 Drawing Sheets

RETRACTABLE GAS TURBINE INLET COILS

BACKGROUND

The present application relates generally to gas turbines and more particularly to a retractable chiller coil arrangement in gas turbine inlet filter house.

BACKGROUND OF THE INVENTION

Gas turbine engines typically include a compressor for compressing incoming air, a combustor for mixing fuel with the compressed air and igniting the fuel/air mixture to produce a high temperature gas stream, and a turbine section that is driven by the high temperature gas stream. It is generally accepted that lowering the temperature of the inlet air entering the compressor results in an increased power output, and there are known methods for reducing the air inlet temperature to the engine in so-called power augmentation systems. A power augmentation system may include a chiller coil in the filter house, along with evaporative coolers that reduce the temperature of the inlet air stream. Examples of power augmentation arrangements are described in, for example, U.S. Pat. No. 7,007,484 B2 and U.S. Patent Publication No. 2005/0056023 A1.

The use of an inlet-chiller-type power augmentation system utilizing coils, however, adds resistance to the air flow entering the compressor, creating an undesirable pressure drop in the inlet system. Turbine efficiency and power output are also a direct function of the inlet system pressure drop, so that the higher the inlet system pressure drop, the lower the efficiency and power output of the turbine.

Thus, while the power augmentation system increases the gas turbine output and efficiency when operating at the desired ambient conditions, it has been determined that when the power augmentation system is not operating, the additional pressure drop that the system adds to the air inlet stream reduces the gas turbine efficiency and output.

Some attempts have been made to alleviate the increase in pressure losses at the inlet by incorporating air bypass passages on both sides of the chiller coils, re-routing the inlet air around the chiller coils when the power augmentation system is not in operation. This approach, however, requires larger inlet filter houses and attendant higher costs.

There remains a need, therefore, for an inlet chiller coil system that minimizes pressure loss at the compressor inlet, equally when the power augmentation system is not in use.

BRIEF SUMMARY OF THE INVENTION

In a first exemplary but nonlimiting embodiment, the present invention provides a gas turbine inlet heat exchange coil assembly comprising a gas turbine inlet housing formed to include an inlet and an outlet and a flow path therebetween; a plurality of adjacent coils located in proximity to the inlet, and moveable between a closed operative position where the coils are aligned substantially in a plane so as to maximize resistance to flow along the flow path, and an open inoperative position where the coils are individually rotated substantially 90° such that the heat exchange coils lie in individual, parallel planes so as to minimize resistance to flow along the flow path.

In another exemplary but nonlimiting aspect, the invention provides a gas turbine inlet compressor chiller coil assembly comprising a gas turbine inlet housing formed to include an inlet and an outlet and a flow path therebetween; a plurality of adjacent, substantially vertically-oriented chiller coils located in proximity to the inlet, and moveable between a closed operative position where the chiller coils are aligned substantially in a vertical plane so as to maximize resistance to flow along the flow path, and an open inoperative position where the chiller coils are individually rotated substantially 90° such that the heat exchange coils lie in individual, substantially parallel vertical planes so as to minimize resistance to the air flow along the flow path; and at least one actuator for moving the plurality of adjacent, substantially vertically-oriented the coils between the closed operative position and the open inoperative position.

In still another exemplary but nonlimiting aspect, the invention provides a method of managing a power augmentation system located in an inlet filter house to a gas turbine comprising aligning individual heat exchange coils of a chiller unit so as to be substantially aligned within a substantially vertical plane when the power augmentation system is operating; and rotating the individual heat exchange coils of a chiller unit so as to be oriented in plural substantially parallel planes and thus minimizing flow resistance, when the power augmentation system is not operating.

The invention will now be described in detail in connection with the drawings identified below.

DETAILED DESCRIPTION OF THE INVENTION

Figure 1:
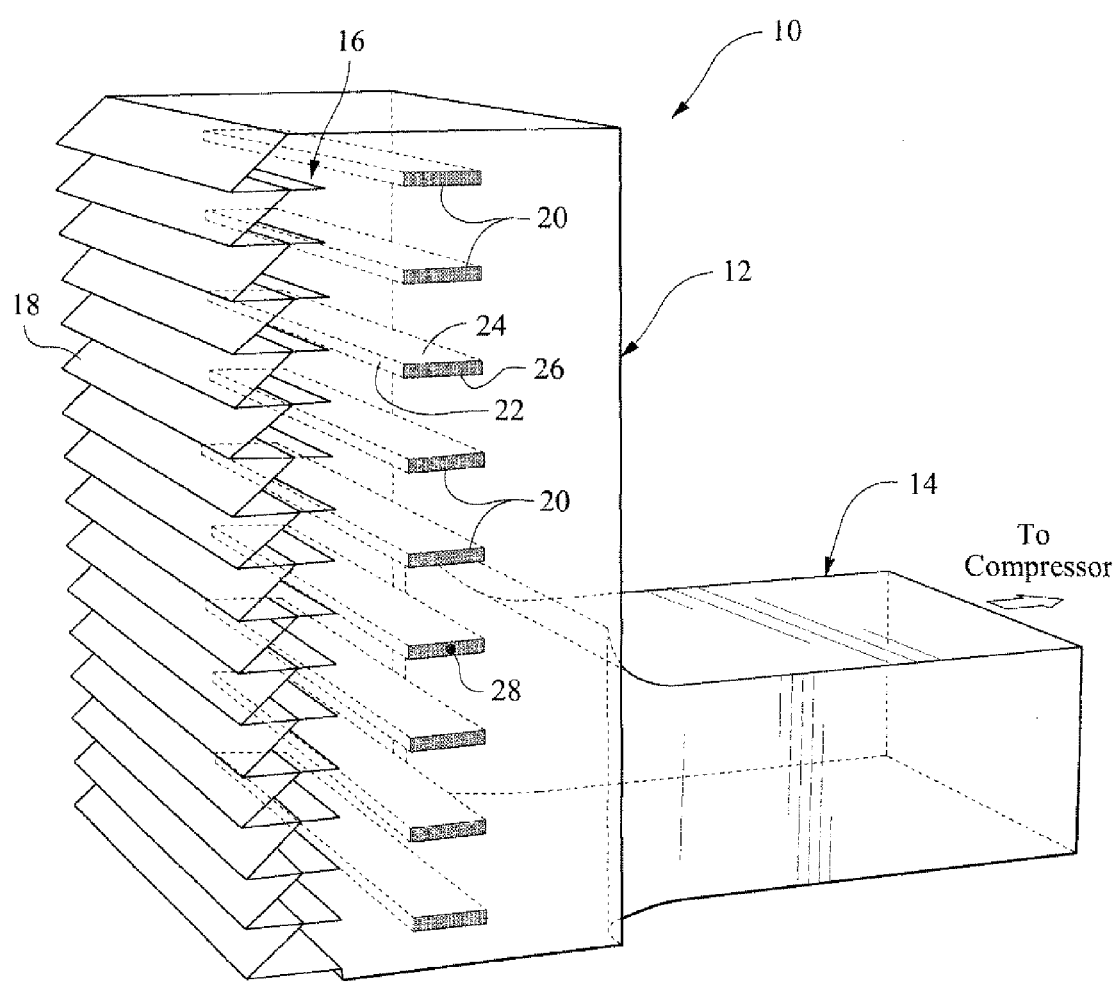
FIG. 1 is a partial perspective view of a gas turbine inlet filter house and chiller coil configuration in accordance with a first exemplary but nonlimiting embodiment.

With reference initially to FIG. 1, a inlet filter house or housing 10 is shown to include a first substantially vertically-oriented duct section or filter house envelope 12 joined to a second substantially horizontally-oriented inlet duct section 14 that leads to the turbine compressor (not shown). The invention is not limited, however, to any particular inlet/duct configuration. The filter house envelope 12 is typically a box-like structure with a number of filters (not shown) positioned at the inlet 16 to limit the intake of dust or debris into the gas turbine engine. A plurality of substantially horizontally-oriented and vertically-aligned louvers 18 guide the inlet air into the filter house.

Also positioned within the envelope 12, downstream and adjacent the filters, there is a power augmentation system which may comprise a vertically-aligned array of porous inlet heat exchanger or chiller coils 20, lying directly in the inlet air flow path. As will be described in greater detail below, the chiller coils 20 are formed of a porous media, having a thin, rectangular shape, each coil defined generally by a thin peripheral edge 22 connecting a pair of broad, parallel sidewalls 24, 26. Each porous heat exchange coil 20 contains many individual heat exchange tubes. The construction of the chiller coils 20 per se is known and need not be further described. The chiller coils 20 are used to decrease the temperature of the inlet air when it is desired to augment the power output of the turbine. However, when ambient temperature is low enough, and/or when the power augmentation feature is not otherwise employed, the chiller coils 20 may be shut down. As shown in a normal operating position, where edges 22 of adjacent coils are substantially engaged (see FIG. 2), it will be appreciated that even though the inlet air will flow through the porous coils when "closed" as in FIG. 2, there will nevertheless be increased resistance to air flow, and thus an increased inlet air system pressure drop and subsequent decrease in power output.

Figure 2:
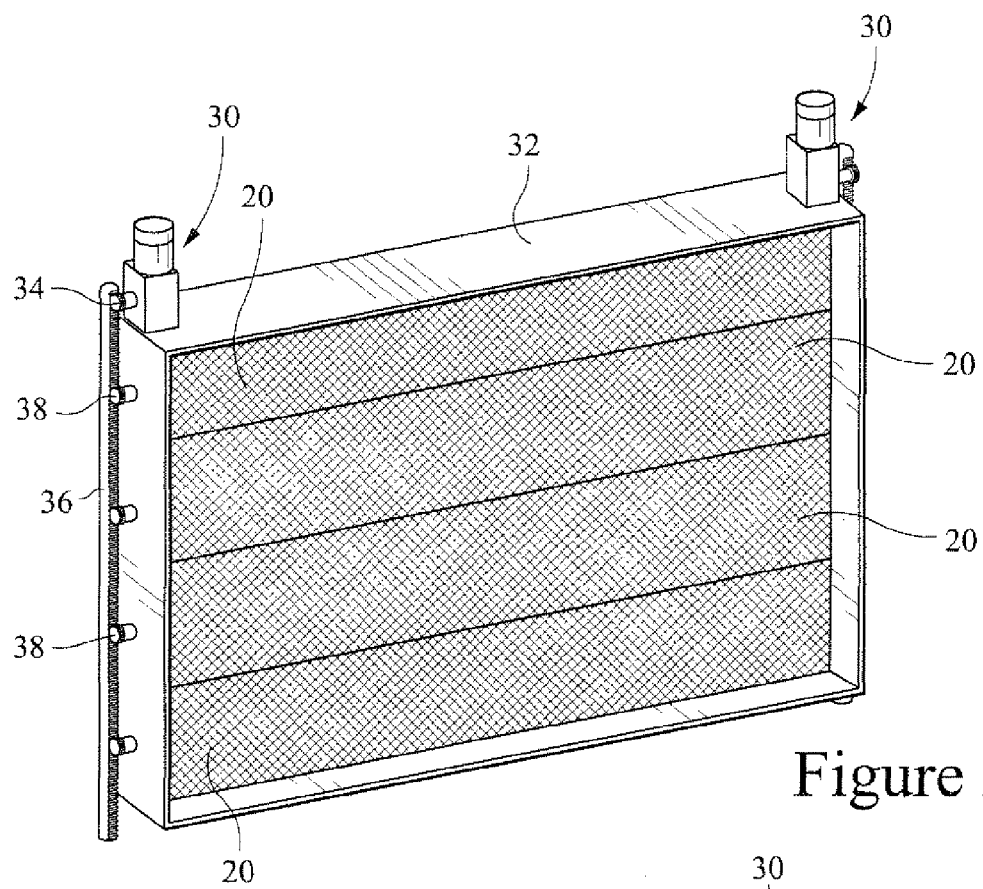
FIG. 2 is a partial perspective view of a chiller coil configuration similar to that shown in FIG. 1 but with the coils in a closed, normal operating position.
Figure 3:
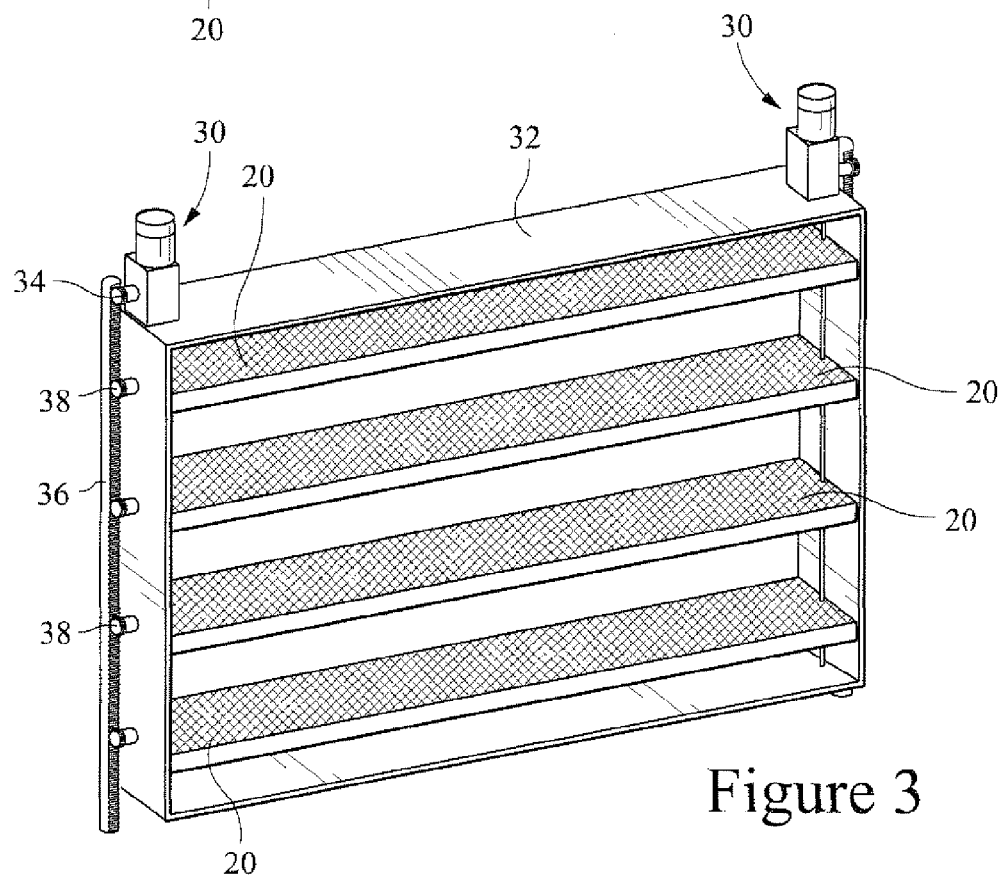
FIG. 3 is a partial perspective view of the chiller coil configuration of FIG. 2 but with the coils in an open, non-operative position.

In accordance with a first exemplary but nonlimiting embodiment of this invention, the individual chiller coils 20 are rotatable about respective, horizontal pivot axes (one shown at 28 in FIG. 1, lying on the longitudinal center axis of the coil) substantially ninety degrees between an in-use, closed position shown in FIG. 2 and an inoperative, opened position as shown in FIGS. 1 and 3.

More specifically, when the inlet coils 20 are not in operation, they will be rotated ninety degrees so that the thin peripheral edges 22 face the flow path, with the broader sidewalls 24, 26 of each tube lying parallel to each other and to the flow direction, thus reducing surface area resistance to flow through the chiller coils. In this position, the flowpath opens up, allowing the inlet air to pass with only minimal resistance, thus also minimizing inlet air pressure loss.

Figure 4:
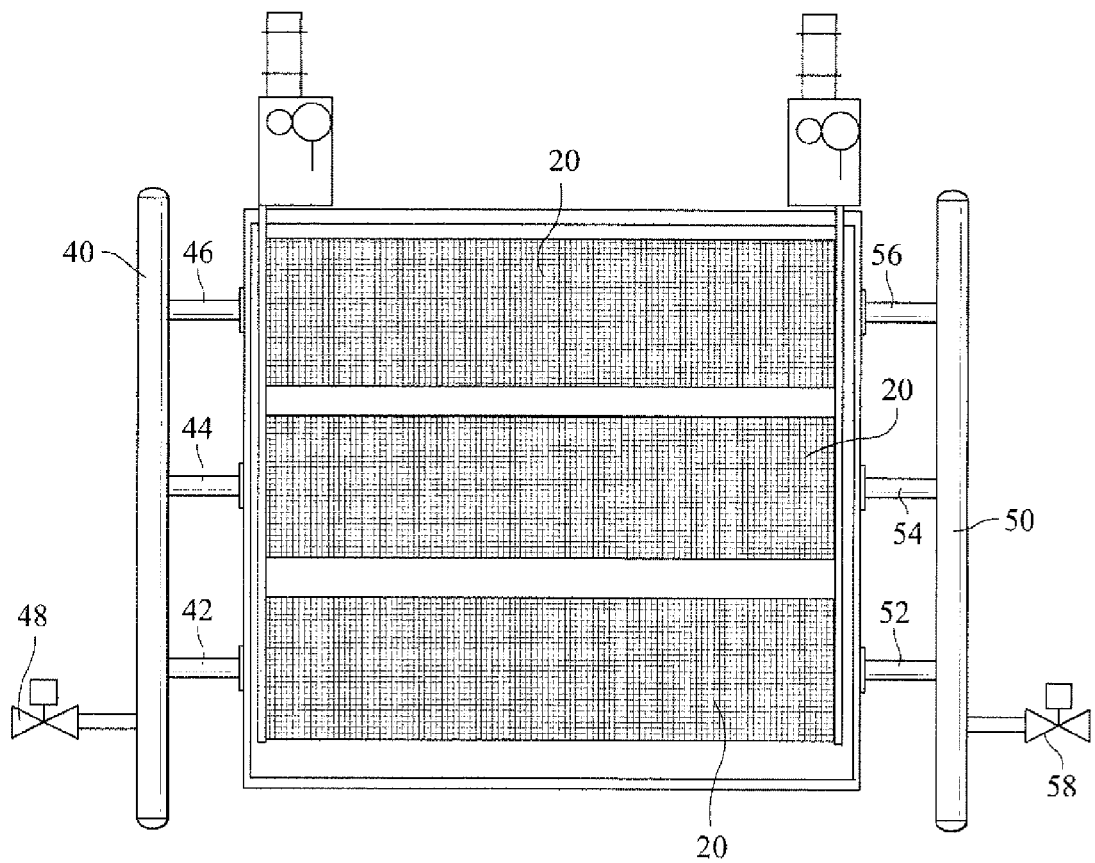
FIG. 4 is a front elevation of a chiller coil configuration in accordance with another exemplary embodiment.
Figure 5:
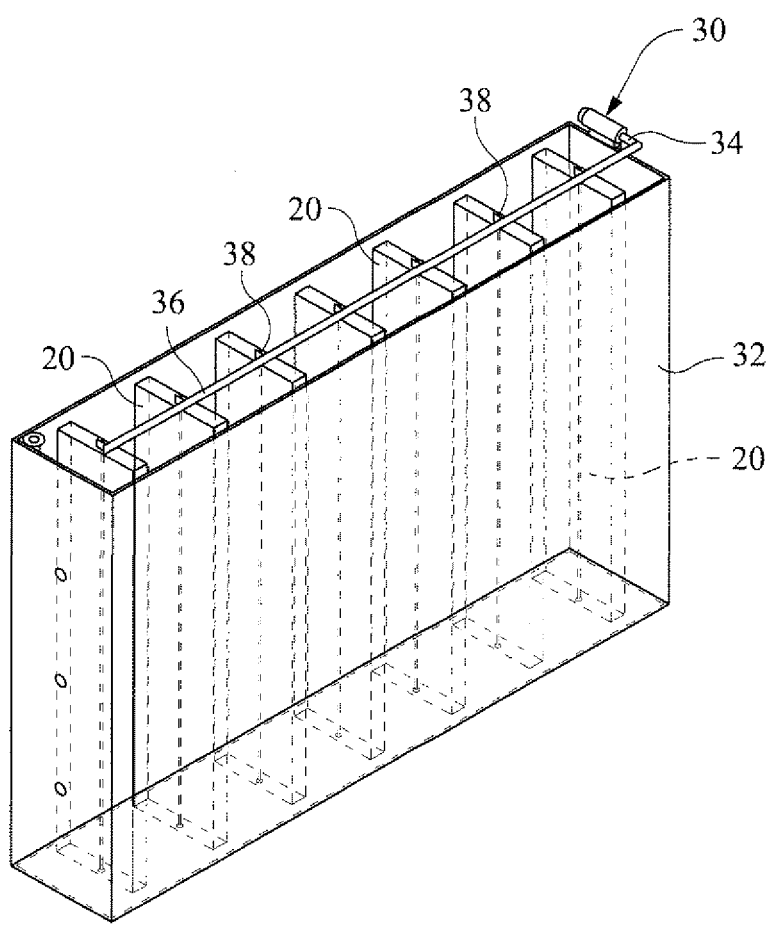
FIG. 5 is a partial perspective view of a chiller coil configuration in accordance with another exemplary but nonlimiting embodiment, where the coils are vertically oriented.

It will be appreciated that the chiller coils 20 may be arranged horizontally as shown in FIGS. 1-4 or vertically as shown in FIG. 5. When vertically arranged, the pivot axes will be vertically-oriented, but the net effect is the same, i.e., the chiller coils may be rotated between open and closed positions as described above and in further detail below.

In one exemplary but nonlimiting embodiment, the inlet coils 20 are rotated by a rack-and-pinion linear actuator, best seen in FIGS. 2, 3 and 5. More specifically, one or more actuators 30 (for example, an electric motor) may be arranged on a frame 32 with its output shaft mounting a spur gear 34 that meshes with a linear rack 36 extending along one or both sides of the array of chiller coils 20. Each chiller coil 20 supports a spur gear 38 aligned with its respective pivot axis 28, the spur gear 38 and coil 20 rotated by the linearly reciprocal, toothed rack 36 in an otherwise typical rack-and-pinion setup. It also will be appreciated that the second actuator 30 may be employed at the opposite side of the coil frame depending on size, number of coils, etc. It will be appreciated that substantially the same arrangement may be utilized whether the coils are arranged horizontally or vertically. In addition, the actuator arrangement is not limited to a rack and pinion arrangement; any suitable rotary-to-linear actuator system may be utilized.

Returning to FIG. 4, where the coils 20 are shown to be substantially horizontally oriented, the chilled water (or other suitable) cooling fluid may be supplied to the chiller coils 20 via an inlet manifold 40 and individual inlet branch pipes 42, 44 and 46, controlled by a valve 48. A "warm" water return manifold 50 is connected to the individual return branch pipes 52, 54, 56 controlled by valve 58. "Warm" as used above merely refers to the fact that the chilled inlet water absorbs heat from the inlet air passing over the coils and is thus at a higher temperature when it exits the coils. The inlet and outlet branch pipes 38 and 44 are coaxial with the pivot axes of the coils, thus requiring conventional rotatable couplings between the coils 20 and the pipes.

It will be appreciated that the size and number of coils 20 may vary depending on specific applications. By way of example only, FIG. 1 shows nine coils in an open position;

FIGS. 2 and 3 show four coils in closed and open positions, respectively; and FIG. 4 shows three coils in a partially open position.

It will be appreciated that the retractable coil system described herein has applicability in heat exchange arrangements that cool or heat a stream of air flow across/through the heat exchange media, and in the case of a turbine inlet filter house, the coils may be located upstream or downstream of filter.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine inlet heat exchanger coil assembly comprising:
a gas turbine inlet housing formed to include an inlet and an outlet and a flow path therebetween;
a plurality of adjacent heat exchange coils located in proximity to said inlet and moveable between a closed operative position where said coils are aligned substantially in a plane so as to maximize resistance to flow along said flow path, and an open inoperative position where said heat exchange coils are individually rotated substantially 90° such that said heat exchange coils lie in individual, parallel planes so as to reduce resistance to flow along said flow path.

2. The gas turbine inlet heat exchanger coil assembly of claim 1 wherein each of said plurality of adjacent heat exchange coils extends substantially horizontally.

3. The gas turbine inlet heat exchanger coil assembly of claim 1 wherein each of said plurality of adjacent heat exchange coils extends substantially vertically.

4. The gas turbine inlet heat exchanger coil assembly of claim 1 wherein said plurality of adjacent heat exchange coils are rotated between said closed operative position and said open inoperative position simultaneously by at least one actuator operatively coupled to a rack-and-pinion assembly.

5. The gas turbine inlet heat exchanger coil assembly of claim 1 wherein said plurality of adjacent heat exchange coils each have a relatively thin peripheral edge between a pair of relatively wide sides.

6. The gas turbine inlet heat exchanger coil assembly of claim 1 wherein said inlet housing comprises a gas turbine compressor filter house including a substantially upright first duct section and a substantially horizontal second duct section, said plurality of adjacent heat exchange coils located in said substantially upright first duct section.

7. The gas turbine inlet heat exchanger coil assembly of claim 1 wherein said plurality of adjacent heat exchange coils are each rotated about a pivot axis coincident with a longitudinal center axis of each coil.

8. The gas turbine inlet heat exchanger coil assembly of claim 5 wherein, when in said in-use operative position, said adjacent heat exchange coils are substantially engaged along said peripheral edges.

9. The gas turbine inlet heat exchanger coil assembly of claim 4 wherein said at least one actuator comprises a motor having a geared output shaft engaged with said rack and pinion assembly.

10. The gas turbine inlet heat exchanger coil assembly of claim 9 wherein said output shaft and each of said plurality of heat exchange coils mounts a spur gear engaged with a rack component of said rack and pinion assembly.

11. A gas turbine inlet compressor chiller coil assembly comprising:
- a gas turbine compressor inlet housing formed to include an inlet and an outlet and a flow path therebetween;
- a plurality of adjacent, substantially vertically-oriented chiller coils located in proximity to said inlet, and moveable between a closed operative position where said chiller coils are aligned substantially in a vertical plane so as to maximize resistance to flow along said flow path, and an open inoperative position where said chiller coils are individually rotated substantially 90° such that said heat exchange coils lie in individual, substantially parallel vertical planes so as to minimize resistance to flow along said flow path; and
- at least one actuator for moving said plurality of adjacent, substantially vertically-oriented chiller coils between said closed operative position and said open inoperative position.

12. The gas turbine inlet compressor chiller coil assembly of claim 11 wherein said plurality of adjacent chiller coils are rotated between said closed operative position and said open inoperative position simultaneously by a rotary-to-linear actuator assembly.

13. The gas turbine inlet compressor chiller coil assembly of claim 11 wherein said plurality of adjacent heat exchange coils each have a relatively thin peripheral edge between a pair of relatively wide sides.

14. The gas turbine inlet compressor chiller coil assembly of claim 13 wherein, in said inoperative open position, each of said relatively thin peripheral edges faces said flow path.

15. The gas turbine inlet compressor chiller coil assembly of claim 12 wherein said rotary-to-linear actuator assembly comprises a motor with an output shaft operatively coupled to a rack-and-pinion assembly.

16. A method of managing a power augmentation system located in an inlet filter house to a gas turbine comprising:
- (a) aligning individual heat exchange coils of a chiller unit so as to be substantially aligned within a substantially vertical plane when the power augmentation system is operating; and
- (b) rotating said individual heat exchange coils of the chiller unit so as to be oriented in plural substantially parallel planes and thus minimizing flow resistance, when the power augmentation is not operating.

17. The method of claim 16 wherein each of said plurality of adjacent heat exchange coils extends substantially horizontally.

18. The method of claim 16 wherein each of said plurality of adjacent heat exchange coils extends substantially vertically.

19. The method of claim 16 wherein step (b) is carried out by operatively coupling a rotary actuator to a linearly moveable rack engaged with gears attached to each of said individual heat exchange coils.

20. The method of claim 19 wherein said gears are attached to said individual coils at pivot axes coincident with longitudinal center axes of said heat exchange coils.

* * * * *